United States Patent [19]

Dotzauer et al.

[11] Patent Number: 5,122,559
[45] Date of Patent: Jun. 16, 1992

[54] LIGHTWEIGHT BUILDING BOARD

[75] Inventors: Bernard Dotzauer, Maxdorf; Michael Portugall, Wachenheim; Wilhelm F. Beckerle, Bobenhein-Roxhein; Hans-Juergen Denu, Lampertheim, all of Fed. Rep. of Germany

[73] Assignee: BASF Aktiengesellschaft, Ludwigshafen, Fed. Rep. of Germany

[21] Appl. No.: 756,874

[22] Filed: Sep. 9, 1991

[30] Foreign Application Priority Data

Sep. 13, 1990 [DE] Fed. Rep. of Germany ....... 4029095

[51] Int. Cl.⁵ .............................. C08L 31/02
[52] U.S. Cl. .................... 524/243; 524/244; 524/245; 524/247; 524/251
[58] Field of Search .......... 524/243, 244, 245, 247, 524/251

[56] References Cited

U.S. PATENT DOCUMENTS 3,779,862 12/1973 Bomberger .................. 162/152

FOREIGN PATENT DOCUMENTS 0123234 10/1984 European Pat. Off.

Primary Examiner—Paul R. Michl
Assistant Examiner—Peter Szekely
Attorney, Agent, or Firm—Oblon, Spivak, McClelland, Maier & Neustadt

[57] ABSTRACT

Lightweight building board based on mineral fibers A and thermoplastic binders contains, based on A, from 1 to 25% by weight of a copolymer B having a glass transition temperature of from 70° to 105° C., composed essentially of from 50 to 98% by weight of methyl methacrylate I, from 2 to 50% by weight of one or more acrylic esters II of $C_1$-$C_8$-alkanols, and from 0 to 2.5% by weight of one or more crosslinking monomers III as binder, from 0 to 150% by weight of filler C, and, based on B, from 0.2 to 15% by weight of one or more amines F of the formula

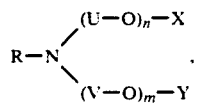

where R is $C_8$-$C_{18}$-alkyl or $C_8$-$C_{18}$-alkenyl, U and V are each $C_2$-$C_4$-alkylene, X and Y are each hydrogen, $C_1$-$C_{18}$-alkyl or $C_2$-$C_{18}$-alkenyl, and n and m are each an integer from 0 to 10, or an acid addition salt thereof.

4 Claims, No Drawings

LIGHTWEIGHT BUILDING BOARD

The present invention relates to lightweight building board based on a mineral fiber A and a thermoplastic binder, which, based on A, contains from 1 to 25% by weight of a copolymer B having a glass transition temperature of from 70° to 105° C., composed essentially of from 50 to 98% by weight of methyl methacrylate I, from 2 to 50% by weight of one or more acrylic esters II of $C_1$-$C_8$-alkanols, and from 0 to 2.5% by weight or one or more crosslinking monomers III as binder, from 0 to 150% by weight of a filler C, and, based on B, from 0.2 to 15% by weight of one or more amines F of the formula

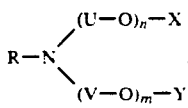

where
R is $C_8$-$C_{18}$-alkyl or $C_8$-$C_{18}$-alkenyl,
U and V are each $C_2$-$C_4$-alkylene,
X and Y are each hydrogen, $C_1$-$C_{18}$-alkyl or $C_2$-$C_{18}$-alkenyl, and
n and m are each an integer from 0 to 10,
or an acid addition salt thereof.

In practice, lightweight building board, for example for soundproofing, is produced in large volumes on the basis of mineral fibers, binders and additionally usually fillers, flame retardants and water repellents. The predominant binder used is starch, which is used in amounts of up to about 15%, based on the mineral fiber. The fillers used are usually finely divided clays, for example kaolin, and the mineral fibers used are rock wool and/or glass fibers, which usually have lengths of from 5 to 50 mm and a linear density of about 1.7-3.3 dtex. The proportion of filler can vary within wide limits; it frequently is within the range from 10 to 30% by weight, based on the mineral fiber. Soundproofing board of this type usually has a thickness of from 1 to 3 cm. A disadvantage of this known lightweight building board is its moisture sensitivity, which usually makes it necessary to coat or impregnate the reverse side of the board with for example thermosetting resins such as aqueous melamine/formaldehyde resins, which necessitates a further drying step. The production of such board is relatively energy-intensive if only for that reason. Furthermore, migration of the starch causes discoloring of decorative coatings, usually applied to the front of the board.

According to U.S. Pat. No. 3 779 862, flexible mineral fiber board is produced by adding an aqueous dispersion of an anionic, self-crosslinking polyacrylate and also an aluminum hydroxide suspension and a synthetic anionic polyelectrolyte to the aqueous slurry of mineral fiber, and then forming the board by dewatering. However, this somewhat complicated process produces board which is neither self-supporting nor moisture-resistant.

Finally, it is known from DE-A 25 45 728 to produce insulating board by binding perlite and rock wool with a polymer dispersion based on a copolymer of butyl acrylate, acrylonitrile and acrylic acid by adding a defibering agent based on an aqueous solution of a carboxyl-containing polyacrylic ester. The insulating board obtained does indeed give very good thermal insulation, but its compressive strength and tensile strength in flexure leave something to be desired.

As embodied in EP-A 0 123 234 and DE-A 36 03 433, mineral fiber board can be produced with methyl methacrylate copolymers as binder, the polymers used having glass transition temperatures of from 30° to 80° C. and from 60° to 110° C. respectively. Mineral fibers, mineral aggregates and anionic polymer dispersions are dispersed in water and the binder is precipitated by adding inorganic salts such as aluminum sulfate or else by adding cationic polymer dispersions. The flocculated precipitate is dewatered on an endless wire. The moist crude board thus obtained is dried at elevated temperature. Board produced in this manner is particularly stable under moist conditions.

However, the most commonly used precipitant aluminum sulfate gives an acidic reaction, as a consequence of hydrolysis, gradually lowering the pH of the recycled filtrate from originally about 8 to about 3-4. This has an adverse effect on the mechanical properties of the mineral fiber, which may already be damaged at pH 5. The pH of the reaction mixture during the precipitation also has an effect on the mechanical properties of the ready-produced mineral fiber board via the geometry of the binder flocs. A pH of about 8-9 gives flocs which have very good binding properties. As the pH decreases, the binder flocs change in shape and size and hence in their binding properties.

It is of course possible, by adding alkali, to raise the pH of the dispersion medium back to the most suitable level, but the consequences are an increased salt content in the filtrate and a board of poor dimensional stability in a hot-moist atmosphere.

It is true that the use of ion exchangers would be technically possible, but it would not be sensible for economic reasons.

Similarly, using cationic polymer dispersions as precipitants for the anionic polymer dispersions has practical disadvantages. In addition to doubling the stockholding requirements, it is very difficult to achieve accurate metering in boardmaking. An excess or a deficiency of cationic dispersion can later cause the crude board to stick to the steel surfaces as it dries.

It is an object of the present invention to develop mineral fiber board which possesses high dimensional stability under tropical conditions and which is easier to produce.

We have found that this object is achieved by the lightweight building board described at the beginning.

The lightweight building board contains the customary mineral fibers A suitable for this purpose, for example rock wool, basalt wool or glass fibers usually of from 0.2 to 8, preferably from 0.5 to 5, cm in length and from about 1 to 5, particularly preferably from about 1.5 to 3.5, dtex in linear density. Such mineral fibers can be used in boardmaking in the sized, i.e. surface-coated, state. Sizing agents used for such mineral fibers are customarily mineral oils, synthetic polymers, such as preferably polyacrylate dispersions, and polyacrylic acids.

The thermoplastic binder used is a copolymer B whose glass transition temperature is within the range from 70° to 105° C., preferably within the range from 80° to 100° C. Based on A it is present in the lightweight building board in a proportion of from 1 to 25% by weight, preferably from 3 to 15% by weight, in particular from 6 to 10% by weight.

The copolymer B is from 50 to 98% by weight, preferably from 75 to 95% by weight, methyl methacrylate I and from 2 to 50% by weight, preferably from 5 to 25% by weight, an acrylic ester II of a $C_1$-$C_8$-alcohol, such as methyl acrylate, n-butyl acrylate, isobutyl acrylate, octyl acrylate or ethylhexyl acrylate.

In some cases it is of advantage to include crosslinking monomers III such as 1,4-dimethacryloyloxybutane or divinylbenzene in small amounts, preferably from 0.5 to 2.5% by weight.

In general, the polymers B are used in the production of the lightweight building board in the form of their aqueous cationic dispersions, which are prepared by emulsion polymerization using, based on the dispersion, from 0.1 to 4, preferably from 0.2 to 2, % by weight of water-soluble ammonium salts of amines F with organic or inorganic acids as emulsifier. Amines F are long-chain amines having from 8 to 18 carbon atoms in the hydrocarbon moiety, which may carry one or two further radicals on the nitrogen atom. Such radicals include not only $C_1$-$C_{18}$-alkyl and $C_2$-$C_{18}$-alkenyl groups but also polyalkylene oxide radicals which consist of up to 10 $C_2$-$C_4$-alkylene oxide units and carry hydrogen, $C_1$-$C_{18}$-alkyl or $C_2$-$C_{18}$-alkenyl in the terminal position. Examples thereof are laurylamine, dimethyloleylamine and the reaction product of 1 mol of stearylamine with 10 mol of ethylene oxide. Ammonium salt formation is effected using for example inorganic acids such as hydrochloric acid, hydrobromic acid, sulfuric acid and phosphoric acid or organic acids such as formic acid, acetic acid and glycolic acid.

The amines F or their acid addition salts are present in the lightweight building board of the present invention in an amount, based on binder B, of from 0.2 to 15% by weight, preferably from 0.5 to 8% by weight, in particular from 0.8 to 4% by weight.

Such cationic polymer dispersions are commercially available, are preferably finely divided and in general have a residual monomer content of less than 200 ppm, preferably less than 100 ppm, and a pH of about 2-6, preferably from 3 to 5. They also have a solids content of preferably 30-60, particularly preferably 40-55, % by weight.

As filler C it is possible to use finely divided clays, for example expanded clays, kaolin and montmorillonite, feldspar, chalk, diatomaceous earth and mica or other organic or inorganic lightweight fillers. Their proportion based on A can be up to 150% by weight. Preference is give to 20-100% by weight, in particular 40-60% by weight.

The lightweight building board, which generally has a very low flammability rating, may additionally contain, based on the mineral fibers, up to 10, preferably from 1 to 3, % by weight of customary fire-proofing agents D, for example aluminum silicates and hydroxides and/or phosphates, such as primary sodium phosphate.

Finally, to produce lightweight building board, it can be advantageous in some cases to add up to 5% by weight, based on the mineral fibers, of additional water repellents E such as silicones (polysiloxanes) and waxes.

The novel lightweight building board can be provided on its visible surface with for example customary sound-absorbing structures and be coated in a conventional manner. Suitable coating compositions for this purpose based on aqueous polymer dispersions are commercially available and may be colored in a conventional manner.

The lightweight building board of the present invention is obtainable by the process of the present invention as follows:

The mineral fibers A are suspended in water with or without additives C, D and E. Then an aqueous dispersion of copolymer B which also contains the acid addition salts of the amines F is added with stirring. A precipitant G is then added to precipitate the binder on the fibers. The board is obtained by separating off the aqueous phase by sheet formation in a conventional manner, for example on a wire-cloth. Afterwards the sheets are dried in general at from 110° to 220° C., preferably at from 140° to 180° C., by means of heat sources such as infrared radiators, hot air and microwaves.

The precipitants G used are inorganic, ionic bases such as the borates, carbonates, bicarbonates and hydroxides of alkali and alkaline earth metals, such as calcium hydroxide. Preference is given to using borax, which produces binder flocs having very good binding characteristics. The board thus produced contains residual amounts of borax, which improve still further the already very favorable flammability rating of the board (fire class A2, DIN 4102).

The use of commercial flocculants, such as polyacrylamide, for flocculating finely divided portions of the inorganic aggregates is frequently advantageous, since this gives clearer filtrates.

The ready-dried board generally has a thickness of from 0.5 to 10, preferably from 1 to 5, particularly preferably from 1 to 2, cm.

Surprisingly, the cationic polymer dispersions develop greater binding power than anionic ones; that is, lower binder concentrations give similar stiffness values (dimensional stability of the board).

The novel lightweight building board is notable for low water imbibition and, following an appropriate surface treatment, excellent soundproofing characteristics; it is stiff and it does not sag in a hot-moist atmosphere or in the wet state. It is flame-resistant, and any absorbed water desorbs very readily without loss of the board's functional characteristics. The novel lightweight building board can be produced by the novel manufacturing process in a particularly energy-saving manner, since, when these consolidated boards are being dried, the water is significantly easier to remove by evaporation than if starch is used as binder. Another advantage is that the waste water from the manufacturing process is virtually free of pollutants. The board is readily machinable and rotproof.

EXAMPLES

The mineral wool used in the Examples which follow comprises fibers 3 cm in length on average with a linear density of less than 3.3 dtex.

A. PRODUCTION OF LIGHTWEIGHT BUILDING BOARD

Example 1

A mixture of
7000 g of water
240 g of mineral wool and
115 g of kaolin
was admixed with 58 g of a 40% strength by weight dispersion of a polymer of
80% by weight of methyl methacrylate
10% by weight of methyl acrylate
10% by weight of butyl acrylate
and, based on the polymer,
0.8% by weight of laurylammonium glycolate as emulsifier by vigorous stirring.
Then
415 g of a saturated calcium hydroxide solution were added as precipitant followed after 4 min by
4 g of a 10% strength by weight solution of a copolymer of
70% by weight of acrylamide and
30% by weight of diethylaminoethyl acrylate as flocculant.

The pulp obtained was then dewatered in a boxwire (25×25 cm) with a slight vacuum and the aid of a plunger to produce a crude sheet having a residual moisture content of about 40% by weight. It was then dried in a microwave oven for 18 min.

Example 2

The board was produced as described in Example 1, except that the binder used comprised
40 g of a 50% strength by weight dispersion of a polymer of
90% by weight of methyl methacrylate,
10% by weight of butyl acrylate
and, based on the polymer,
0.5% by weight of the acetate of the reaction product of 1 mol of laurylamine with 10 mol of ethylene oxide as emulsifier
and the precipitant used comprised
39 g of a 2% strength by weight solution of sodium tetraborate ($Na_2B_4O_7$).

Example 3

The board was produced as described in Example 1, except that the binder used comprised
30 g of a 55% strength by weight dispersion of a polymer of
95% by weight of methyl methacrylate,
5% by weight of ethylhexyl acrylate
and, based on the polymer,
1.2% by weight of stearylammonium hydrochloride as emulsifier
and the precipitant used comprised
39 g of a 2% strength by weight solution of sodium tetraborate ($Na_2B_4O_7$).

Example 4

The board was produced as described in Example 1, except that the binder used comprised
45 g of a 38% strength by weight dispersion of a polymer of
75% by weight of methyl methacrylate,
25% by weight of methyl acrylate
and, based on the polymer,
1.3% by weight of a mixture of formates of linear $C_{12}$-$C_{15}$-alkylamines as emulsifier
and the precipitant used comprised
390 g of a saturated calcium hydroxide solution.

B. TESTING OF LIGHTWEIGHT BUILDING BOARD

To test the boards obtained, test specimens were cut out of them to a length of 25 cm and a width of 5 cm. The thickness of the test specimens (1.5 cm) was measured with a vernier. They were weighed and their density was determined.

To determine the water imbibition, the specimens were immersed in water. They were weighed after 1 hour and after 2 hours, and the water imbibition was calculated by expressing their weight increase as a percentage of the dry weight.

To determine the dimensional stability, the specimens were placed on their short sides, loaded with a 1 kg weight and stored in that state at 38° C. and a relative humidity of 95% for 14 days. Then the sag was measured.

| Example No. | Properties of lightweight building board | | | | |
|---|---|---|---|---|---|
| | Glass transition temperature of polymer $T_G$ [°C.] | Density of board [g/cm$^3$] | Water imbibition in % by weight after | | Dimensional stability Sag [mm] |
| | | | 1 h | 2 h | |
| 1 | 82 | 0.32 | 8.9 | 12.4 | 0.5 |
| 2 | 94 | 0.30 | 11.0 | 14.7 | 0.0 |
| 3 | 97 | 0.29 | 10.2 | 15.0 | 1.0 |
| 4 | 85 | 0.34 | 7.1 | 13.8 | 0.0 |

We claim:
1. A lightweight building board based on a mineral fiber A and a thermoplastic binder, containing, based on A,
from 1 to 25% by weight of a copolymer B having a glass transition temperature of from 70° to 105° C., composed essentially of
from 50 to 98% by weight of methyl methacrylate I,
from 2 to 50% by weight of one or more acrylic esters II of $C_1$-$C_8$-alkanols, and
from 0 to 2.5% by weight of one or more crosslinking monomers III as binder,
from 0 to 150% by weight of a filler C,
and, based on B,
from 0.2 to 15% by weight of one or more amines F of the formula

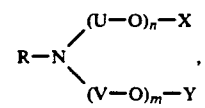

where
R is $C_8$-$C_{18}$-alkyl or $C_8$-$C_{18}$-alkenyl,
U and V are each $C_2$-$C_4$-alkylene,
X and Y are each hydrogen, $C_1$-$C_{18}$-alkyl or $C_2$-$C_{18}$-alkenyl, and
n and m are each an integer from 0 to 10,
or an acid addition salt thereof.

2. A process for producing a lightweight building board as claimed in claim 1 by treating a mineral fiber with a thermoplastic binder, which comprises suspending the mineral fiber A with or without additives C, D and E with an aqueous dispersion of a copolymer B containing an acid addition salt of an alkylamine F and with a precipitant G, separating off the aqueous phase with sheet formation, and drying the residue.

3. A process as claimed in claim 2, wherein the precipitant G is borax.

4. A process as claimed in claim 2, wherein the precipitant G is an alkali or alkaline earth metal hydroxide.

* * * * *